United States Patent [19]

Hill

[11] Patent Number: 4,780,167

[45] Date of Patent: Oct. 25, 1988

[54] METHOD OF MAKING POLYIMIDE FOAM STRUCTURES OF CONTROLLED DENSITY AND INCREASED RIGIDITY

[76] Inventor: Francis V. Hill, 4346 Hortensia St., San Diego, Calif. 92103

[21] Appl. No.: 111,851

[22] Filed: Oct. 23, 1987

[51] Int. Cl.$^4$ ............................................. B32B 31/06
[52] U.S. Cl. .................................. 156/245; 156/307.3; 156/331.1; 156/331.5; 264/137; 264/321; 521/184; 521/185; 521/189; 521/918
[58] Field of Search .................. 156/245, 307.3, 331.1, 156/331.5; 264/137, 321

[56] References Cited

U.S. PATENT DOCUMENTS 4,692,199  9/1987  Kozlowski et al. .................. 156/245
4,715,916 12/1987  Shimada ............................. 156/245

Primary Examiner—Morton Foelak
Attorney, Agent, or Firm—Frank D. Gilliam

[57] ABSTRACT

A method of making structural panels having a controlled density polyimide core, generally with at least one face sheet. An open cell polyimide foam panel is impregnated with a liquid polyimide precursor, compressed to squeeze out all but a desired quantity of the polyimide precursor and dried. One or two face sheets are impregnated with the same liquid polyimide precursor and placed on one or both faces of the foam panel, with pre-drying of the face sheet if desired. This assembly is placed in a mold and subjected to slight compression. The assembly is heated to a moderate temperature for a suitable time to take on the mold configuration. Then the assembly is heated to the curing temperature of the polyimide precursor for a period sufficient to cause curing. The resulting structural panel has a selected density, which determines strength and rigidity, weight and other physical characteristics, controlled by the amount of precursor allowed to remain after the impregnation foam compression step.

16 Claims, 1 Drawing Sheet

METHOD OF MAKING POLYIMIDE FOAM STRUCTURES OF CONTROLLED DENSITY AND INCREASED RIGIDITY

BACKGROUND OF THE INVENTION

This invention relates in general to foam or foam core structural panels and, more specifically, to structural panels having a polyimide foam core of controlled density.

Foamed plastic structures have long been made using a variety of synthetic resins and various molding methods. In some cases blowing agents are added to cause foaming when heated and in others the polymerizing or curing reaction generates the foaming agent. In some cases open-cell foams are produced and in others, closed-cell foams result. Depending on the resin to be used and the required physical characteristics of the product these different prior methods may or may not be acceptable.

For many applications, such as airplane or ship ducting, in manned space vehicles or other human-occupied closed structures, panels using polyimide foam have been found to be ideal since polyimides are highly fire resistant and do not give off toxic gases when heated to degradation temperatures. Polyimides, however, require high curing temperatures which many of the prior foam manufacturing and reshaping methods cannot efficiently apply. Also, for many applications the density of the foam (which directly affects the weight rigidity and strength of the foam structure) must not only be closely controlled but also be variable within wide limits depending upon the planned use for the foam structure being made.

Foaming between moving endless belts has been used with a variety of resins. This method has been used, for example, with phenolics, as described by Bruning et al. in U.S. Pat. No. 3,883,010, with polystyrene as described by Charpentier in U.S. Pat. No. 3,863,908 and with polyurethane as described by Willy in U.S. Pat. No. 3,998,884. While apparently effective with those resins, this method is not applicable to controlled density polyimide foam because of the much longer periods at much higher temperatures required for polyimides which require excessively long and/or very slowly moving belts operating in a very large high temperature oven. Also, this technique produces only flat panels and not the other shapes often required.

Polyimide foams, therefore, are ordinarily produced in closed molds where particular thicknesses and surface configurations are required. Typical of such methods are those disclosed by Long et al. in U.S. Pat. No. 4,621,015 and Shulman et al. in U.S. Pat. No. 4,647,587. If desired, a liner may be placed in the mold prior to introduction of the foamable liquid to bond to the foam as it expands and cures. The foam produced in closed molds tends to be very irregular and lack uniformity of cell size, density and strength across the mold. Often, the gasses emitted by the polyimide precursor during foaming inhibit the growth of the cells in the foam itself, making foaming action low and unpredictable. These problems increase when attempts are made to vary the foam product density by varying the amount of precursor placed in the mold.

Impervious face sheets are required on many foam structures or panels. Face sheets can be adhesively bonded to the foam panels after the panels are cured, or the face sheets can be placed in the mold prior to foaming. Adhesive bonding has the inherent disadvantages of adding another agent which usually will not have the high temperature resistance of the foam and may emit toxic gasses when heated. The bonding step adds complexity to the manufacturing operation and, if not very carefully done, may result in bond failure and de-lamination in use. Where the face sheets are placed in the mold prior to foaming poor bonds often result because the foaming resin does not adequately wet the face sheets. Excess foaming material may be required, resulting in higher foam weight, in order to assure complete mold filling and sufficient foam pressure against the face sheet during foaming to obtain a good bond.

In some cases, polyimide precursors are foamed under ambient pressure in open molds. The resulting foam layer is then sliced parallel to the bottom of the mold to produce panels of the desired thickness. Ordinarily, only flat panels can be made by this method. While this produces more uniform cell size and density, it is difficult to produce panels of different, controlled, varying densities for different or complex structural application. Also, adhesive bonding, with all of the drawbacks mentioned above, is the only available method for applying a face sheet to the sliced surface of the foam panel.

Thus, it is apparent that there is a continuing need for a method of making complex polyimide foam structures having uniform cell size, varying density and other physical characteristics while permitting easy and precise control of foam density and which allows face sheets to be securely and reliably bonded to one or more foam surfaces.

SUMMARY OF THE INVENTION

The above-noted problems, and others, are overcome by the method of this invention which basically comprises providing an open-cell polyimide foam panel, impregnating the panel with a liquid polyimide precursor, compressing the panel (such as passing it between closely spaced rollers) to squeeze out all but a desired quantity of the polyimide precursor, impregnating at least one face sheet with the polyimide precursor where desired, bringing the face sheet into contact with a face of said panel and heating the resulting assembly to a temperature sufficient to cure the polyimide precursor.

For precise size control and to assure full contact between the face sheet(s) and foam core, it is preferred the assembly be cured in a closed mold with slight pressure on the face sheet, typically sufficient pressure to compress the foam core about 5-10% in thickness. Where the mold surface has a varying shape or pattern, the slight compression will also aid in assuring that the exterior of the assembly after cure exactly conforms to the mold surface.

In some cases only a single face sheet applied to one face of the foam core will be used. However, in most panel applications (where panel width and/or length is much greater than panel thickness) two face sheets adhered to the major panel surfaces will be preferred. In some cases, such as where the foam core has a beam-like square cross-section, face sheets might be applied to three or four surfaces. For tubular structures, the face sheets will ordinarily be applied to both the internal and external surfaces.

For ease of handling and assembly, and to permit convenient storage between the impregnation and assembly steps, it is preferred that both the foam core and face sheets be dried after impregnation, forming what is generally known as "prepregs". Of course, either the face sheet(s) or foam core could be used wet, if desired.

While flat composite panels will often be the desired product configuration, other highly complex shapes may also be produced. For example, tubular curved surfaces can easily be made by assembling face sheets and axial foam sections in a tubular mold to produce a unitary tube after cure. An example of aircraft air-conditioning ducts illustrates the advantages of this method. These ducts vary in cross-section shape and size; the wall thickness may vary; the density may vary from point to point, centerlines are twisted and follow torturous paths.

BRIEF DESCRIPTION OF THE DRAWING

Details of the invention, and of a preferred embodiment thereof, will be further understood upon reference to the drawings, wherein.

DETAILED DESCRIPTION OF THE INVENTION

Figure 1:
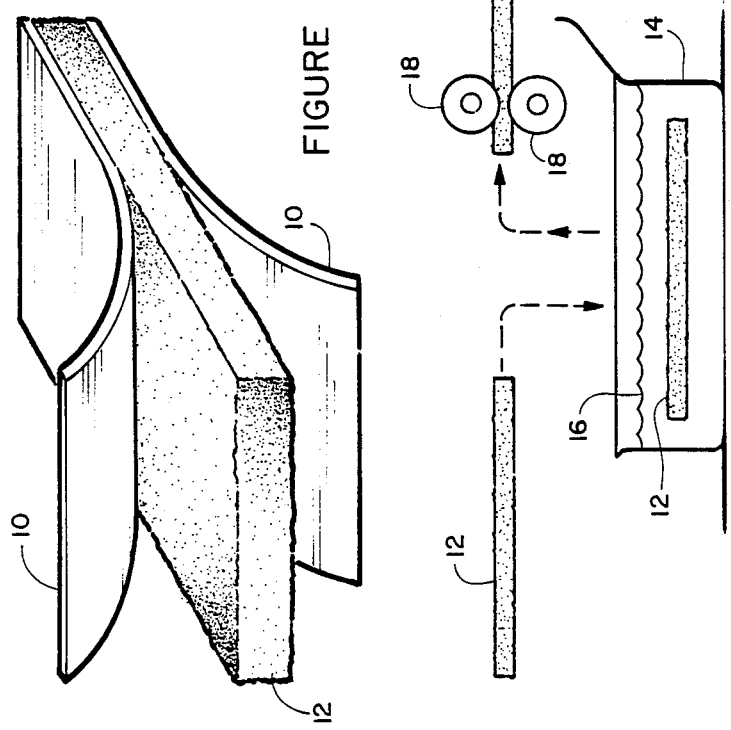
FIG. 1 is a perspective view of a core and face sheets during assembly.

Referring now to FIG. 1 there is seen a pair of face sheets 10 being applied to opposite sides of a polyimide foam panel 12. As detailed below, face sheets 10 and foam core 12 are impregnated with a liquid polyimide precursor and may be either wet with the liquid or may have been dried to prepreg foam.

Any suitable face sheet material, having any suitable dimensions, may be used. Typical face sheet materials include fibrous materials in cloth, mat or blanket form, using fibers such as glass, Kevlar aramids, graphite, ceramics and mixtures or combinations thereof. While these materials are preferred because of their high strength-to-weight ratio, other materials such as cardstock, metal mesh, etc. may be used for special purposes.

The polyimide foam cure may be any suitable open-cell polyimide foam, manufactured by any suitable method. Typical polyimide foams include those open-celled foams disclosed by Gagliani et al. in U.S. Pat. Nos. 4,426,463, 4,439,381 and 4,506,038, by Long et al. in U.S. Pat. Nos. 4,518,717 and by Shulman et al. in U.S. Pat. No. 4,467,597. The polyimide foam may incorporate any suitable additives such as surfactants to improve uniformity of cell structure, blowing agents, fillers, or other agents as desired.

Typical surfactants include FSN and Zonyl from E.I. duPont de Nemours & Co., L550 from Union Carbide Corp., 190 and 193 from Dow Corning Corp., and FC430 from Minnesota Mining and Manufacturing Co. While any suitable concentration may be used, generally from about 0.5 to 2 wt % (based on the weight of the liquid foam precursor) is preferred.

Typical fillers include glass microballoons, fibers (e.g., glass, graphite, Kevlar aramids, ceramic) fluorocarbon powders and the like.

Where the assembly is to be compressed slightly during curing of the impregnating polyimide precursor, the original foam core should be correspondingly thicker than the desired product thickness. Thus, if the foam is to be compressed 10% during cure, the preformed assembly thickness should be 10% greater than the final thickness desired.

Figure 2:
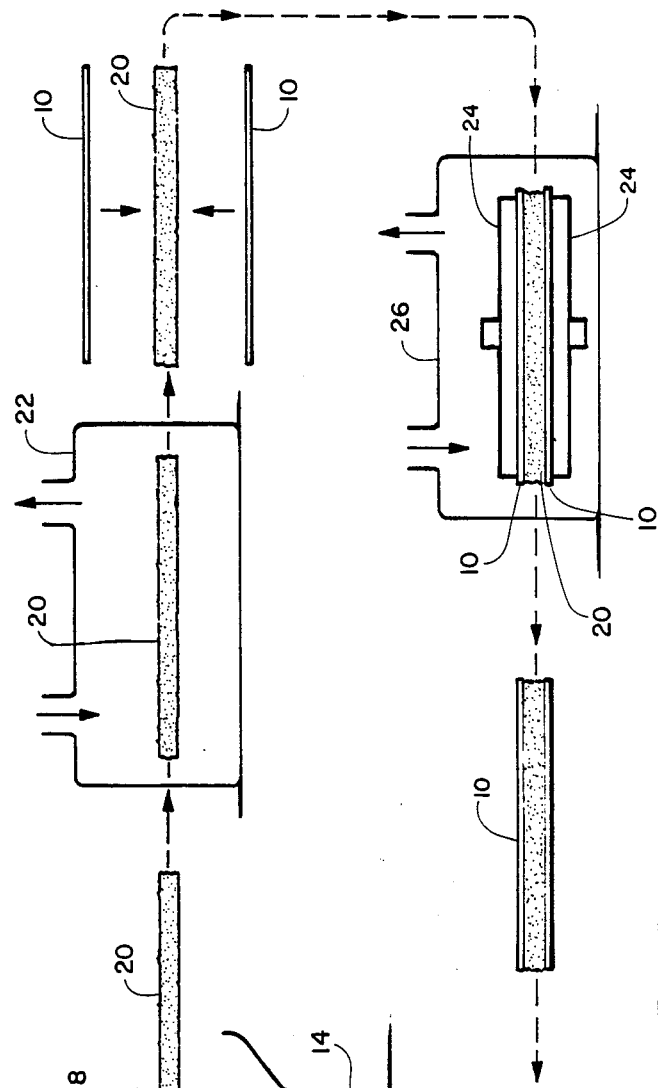
FIG. 2 is a schematic flow diagram illustrating the steps in my method.

The steps in manufacturing my controlled density polyimide foam structures are schematically illustrated in FIG. 2.

Initially, foam core 12 is provided having the desired dimensions as discussed above. Foam core 12 is dipped in a container 14 containing a polyimide coating precursor 16 to thoroughly impregnate the core (which is, of course, substantially entirely open-cell.) Any suitable polyimide precursor which forms a coating when cured and is compatible with the foam cure and face sheet materials may be used. The polyimide precursor from which the foam core was made is generally suitable. Typical polyimide coating precursors include 2601 Skybond from the Monsanto Corporation and the precursors described in the above-listed U.S. patents relating to polyimide foams and other polyimide materials. In some cases, aromatic polyimide precursors may be preferred since they tend to increase stiffness of the final assembly. To improve precursor flow and penetration during impregnation it is preferred that from about 50 to 150wt % of a compatible solvent be mixed with the precursor. The solvent should be selected to be compatible with the other materials being used. Generally, short chain length alcohols such as ethanol are useful. To further aid in coating the foam interstices smoothly and uniformly, it is preferred that the precursor include from about 0.5 to 1.5 wt % of a suitable surfactant. Typical surfactants include those listed above.

Foam core 12 is then compressed by passing it between spaced rollers 18 to squeeze out excess polyimide precursor 16. While other compression means can be used, if desired, such as two spaced plates movable towards each other to squeeze core 12 to squeeze out excess precursor or a wiper blade moved along a foam core 12 resting on a plate, I have found that the roller arrangement produces the most uniform and consistent results and is most easily adjustable. Therefore, I prefer to use the spaced roller arrangement. While generally a single pair of rollers is satisfactory, if desired, several spaced sets, each succeeding set having a narrower gap, may be used to more gradually squeeze out excess polyimide precursor.

The quantity of precursor 16 remaining spread uniformly throughout the foam cells controls many of the physical properties of the final assembly, including density, strength, weight, etc. Core 12 can be weighed before and after passing through rolls 18, the difference being the weight of liquid precursor remaining. By making a number of assemblies containing different amounts of precursor, then testing their physical properties, one quickly learns how to select desired precursor quantity in the product by adjusting the roller gap. I have found this to be highly reproducible and consistent.

While the impregnated core 20 leaving rolls 18 can go on to the laminating step while still wet, I prefer to dry the impregnated core 20 in a drying oven 22. While any suitable drying means may be used, I prefer a conventional low to moderate temperature hot air circulating oven. With most precursors, a temperature of from about 150° to 225° F. for from about 1 to 3 hours is sufficient to dry the precursor to a prepreg form.

The impregnated core 20 is then placed between two impregnated face sheets 10. Face sheets 10 as described above are impregnated with the polyimide precursor described above. The face sheets 10 may be wet or dried to a prepreg in an oven similar to oven 22.

The assembly 28 of core 12 and face sheets 10 is then placed in a suitable mold 24 in an oven 26. As discussed above, the assembly could be cured on an open surface if desired. However, it is preferred that the assembly be compressed slightly between mold plates as schematically indicated with mold 24 to assure good bonding contact between core 12 and face sheets 10. Any suitable mold release may be applied to mold 24 to prevent face sheets 10 from sticking thereto. While oven 26 can be any means suitable for heating assembly 28 to the required temperature, I prefer a circulating hot air oven as schematically indicated or microwave heating for simplicity and convenience. Oven 26 is heated to the curing temperature of the polyimide precursor chosen. Generally, this in the range of from about 425° to 700° for from about 1 to 16 hours.

The consolidated assembly 24 is removed from oven 26, cooled, and is ready for use. Assembly 24 is strong, light weight and well bonded. Physical characteristics are as predicted by the amount of liquid precursor allowed to remain in foam core 12 after compression by rollers 18.

Complex shapes, such as distorted tubes, can be made by either laying up the assembly components in wet form on the mold surfaces and heating to cure the polyimide precursor or by first placing the face sheets on the mold surface and drying them to a fairly stiff, shape retaining state, then reassembling them on the mold surface with the foam core therebetween for cure. If the dried impregnated foam core is fairly flexible (i.e., thin sections), it can be dried in flat form and will easily adapt to the curved shape when assembled between the stiff face sheets on the mold. Warming the core from room temperature to about 150° F. to 200° F. greatly increases its flexibility. If the dried foam core is too stiff for this, it can be laid up in wet form. Where there are gaps or cracks between foam core sheets when laid up on a complex mold surface, small chopped pieces or granules of dried form core trimmings can be used to fill the gaps during assembly. These more complex molds should be designed to apply slight pressure to the assembly during curing to assure proper bonding and reshaping, as discussed above.

The following Examples provide further details of certain preferred embodiments of the method of my invention. Parts and percentages are by weight unless otherwise indicated.

EXAMPLE I

About 150 g. of Monsanto 2601 unadulterated Skybond polyimide prepolymer is mixed with about ½% by weight Dow-Corning 193 surfactant. The solution is rolled onto glass plates and air dried with warm air at about 150° F. The dried coating is scraped off the glass and ground to a powder in a standard kitchen blender. The powder is then spread onto Teflon fluorocarbon coated glass fabric and foamed in a circulating air oven heated to 350° F. for about 45 minutes. After foaming, the temperature is increased to about 575° F. for about 1 hour to cure the polyimide. The resulting flexible foam is trimmed to a thickness of just over 0.5 inch.

The foam is immersed in a pan containing Monsanto 2601 Skybond liquid polyimide precursor mixed with an equal volume of ethanol until it completely absorbs its capacity of the liquid. The foam is then passed between narrowly spaced rolls which squeeze out excess precursor. The foam core is then dried in a circulating hot air oven at about 150° F.

Two sheets of woven glass fiber cloth are soaked in the Skybond/ethanol mixture, then similarly dried at about 150° F. One of the resulting face sheets is placed on each side of the foam cure. The face sheets are trimmed to just larger than the foam. The resulting sandwich assembly is placed between two aluminum mold plates which had been lightly coated with a mold release, Depco 2030 from Aircraft Products, Inc. The aluminum plates are adjusted to lie about 0.5 inch apart, slightly compressing the foam core.

The assembly is placed in an oven for approximately 1 hour at about 375° F., then the temperature is increased to about 620° F. and held there for about 16 hours for curing. The assembly is then removed from the oven and cooled. The assembly is well bonded, strong and light weight, and highly resistant to hydrolysis. If hydrolytic stability is not a paramount requirement, then only 2 or 3 hours of curing at 575° F. would be adequate for reaching maximum strength and rigidity.

EXAMPLE II

A sheet of polyimide foam is prepared in the manner described in Example III of U.S. Pat. No. 4,559,365. The resulting foam has an open-cell structure. Thickness is trimmed to just over 0.4 inch. The foam and pieces of graphic fiber mat are soaked in the polyimide precursor used to make the foam. The foam is passed between slightly spaced rollers to squeeze out about 80% of the liquid precursor, as shown by weighings before and after the foam is passed through the rollers. One wet face sheet is wrapped around a cylindrical mold core, with some overlap. A wet foam sheet is wrapped around the mold core and cut carefully to fit. Trimmings from the foam are dried in an oven at about 170° F. The dried foam trimmings are chopped into small pieces and filled into any small mismatch gaps or cracks in the foam wrapping. Then the second wet face sheet is wrapped over the foam, with some overlap to completely cover the foam. Outer mold members having an internal cylindrical surface are installed over the wet foam and face sheet assembly in a manner slightly compressing the foam. The molds are formed from polypropylene, which is a microwave cavity and heated at a power level of about 10KW for about 10 minutes. The mold is removed, leaving a well consolidated, strong, lightweight tubular assembly.

EXAMPLE III

This example show how to make a complex aircraft air-conditioning duct by this method. A large sheet of polyimide foam is produced by the method shown by Example I. Such ducts are most easily fabricated in two halves, split along a longitudinal axis. Matched sheet metal tooling is made for each half, and each half is fabricated and cured in accordance with the two previous examples. The mating surfaces along which the two faces must be joined are accurately finished by the use of water jet cutters. These faying surfaces are coated with the resin precursor and dried. The two halves of the duct are then assembled and located in a fixture. An overlapping sheet of pre-preg of the face sheet at least two inches wide is applied evenly spaced along the joint line, both inside and outside. This overlapping sheet is held in place by light prssure to insure adequate contact. At this point, other attachments are added in the same manner, including metal flanges, mounting pads, side air take-offs, vanes, etc. The entire assembly is then cured by heating, and the part is finished.

EXAMPLE IV

This example shows how this method can be used to make a fire-resistant pipe insulation for use aboard naval vessels. In the same manner as demonstrated in Example II, half-shell insulation is formed. These half-shell are to be fastened to a composite chilled water line, two half-shells forming the complete circular insulation around the pipe. The pipe is a Bondstrand nominal 2 inch diameter composite tube (2 inch ID, 2.38 inch OD). The insulation is formed to be 1 inch thick, with an inside diameter of 2.40 inches and 4.40 inches outside diameter. Average density of the core is 4 pounds per cubic foot. An external sheath of heavy basket-weave fiberglass cloth pre-preg is used. A 16 inch long section of the pipe with the insulation installed by the use of stainless steel external straps is fire-tested by inserting it into a broad propane flame at 1600° which covers the entire pipe/insulation test sample. After 20 minutes of exposure, the temperature of the interface between the tube OD and the insulation ID does not exceed 325° F. and no damage to the tube is evident.

EXAMPLE V

This example is intended to show how this method can be used to make air ducts for naval vessels. In the same manner as previously described, air ducts are fabricated in two configurations: An 8 inch inside diameter round duct, and a rectangular duct 12 inches by 24 inches outside diameter. Both ducts have a one-inch wall thickness, a core density of about 4 pounds per cubic foot, and an external sheath of pre-preg heavy basket-weave fiberglass. Air ducts may be fabricated from stocked flat sheets which have been fully cured and have the same construction. Samples of these two ducts are subjected to a fire test of 20 minutes duration over a burning pool of heptane fuel which generates 1600° F. flames. At the end of the test, the ducts are still structurally sound, and the inside of the samples show no evidence of damage despite external scorching of the surfaces exposed to the flames. The ducts are corrosion-resistant, fire resistant, are thermally insulative, and can be installed by semi-skilled service and shipyard personnel.

EXAMPLE IV

This example is intended to show how this method may be used for side blocking to be used on the edge of aircraft structural panels. In this case, strips of material 2 inches wide, 48 inches long, and 0.4 inches thick are fabricated by the methods already described. No face sheets are installed, and the core is made to a density of about 20 pounds per cubic foot. This gives a sturdy material to be used on the edge of aircraft structural panels and contributes good screw and fastener retention.

EXAMPLE VII

This example is intended to show how this method may be used for joiner bulkheads aboard naval vessels. Flat panels are made in accordance with the above described method, with similar face sheets and a core thickness of about 1 inch. In this case, the sheets have a core density of between 4 and 8 pounds per cubic inch, and contain Nomex honeycomb core as furnished by Hexel Corp. Metal attaching hardware is molded integral in these 4 feet by 8 feet nominal size panels.

EXAMPLE VIII

This example is to show how this method may be used to make improved shipboard cribbing, used to separate and stabilize cargo, storage bins, etc. In this case, flat sheets are fabricated by the methods previously described to various sizes from 12 inches to 18 inches wide and lengths up to 8 feet with a thickness of approximately one inch, and having heavy glass fiber face sheaths. The core density is from 8 to 12 pounds per cubic foot, and all surfaces are covered by the sheath to avoid edge damage and to limit possible hydrolysis. These are strong, corrosion-resistant, and light-weight as compared to wood or metal configurations.

EXAMPLE IX

This example is to show how this method may be used to make protective fire and accidental damage shields for critical shipboard items such as plastic fire pumps, controls, and valves. In this case, a close fitting split-box is fitted around the item, made in accordance with the methods described previously. The density is about 10 to 20 pounds per cubic foot, heavy impregnated glass fiber face sheets are placed both inside and outside, and metal fasteners are bonded integral with the outside. These fasteners are used to rigidly connect the shield with base plates, or other nearby structural members. Provisions are made for admitting driveshafts, sensors, instruments, etc.

While certain specific conditions, components and proportions have been specified in the above description of preferred embodiments, these may be varied, where suitable, with similar results. For example, other materials could be added to the foam, face sheets and liquid precursor, such as colorants and ultraviolet absorbers. Further, a wide variety or polyimide foam materials and face sheet materials may be used.

Other ramifications, applications and modifications of this invention will become apparent to those skilled in the art upon reading this disclosure. Those are intended to be included within the scope of this invention as defined in the appended claims.

I claim:

1. The method of making a composite structure having a uniform polyimide foam component of controlled density, which comprises the steps of:
   providing a substantially open-cell polyimide foam core having substantially uniform cell size and subtantially uniform density;
   impregnating said foam core with a liquid polyimide precursor;
   compressing said foam shape to squeeze out all but a desired quantity of liquid precursor;
   bringing said face sheet into contact with said foam core;
   heating the resulting assembly to a temperature sufficient to cure said polyimide precursor; and
   whereby a strong, well bonded asesmbly having a uniform selected core density results.

2. The method according to claim 1 wherein said compressing of said foam core is accomplished by passing said foam core between at least one pair of spaced rollers, the space between said rollers being adjusted to squeeze out all but a selected quantity of said polyimide precursor from said foam core.

3. The method according to claim 1 wherein said foam core has thickness substantially less than its length and width and two face sheets are brought into contact with opposite major faces of said foam core.

4. The method according to claim 1 wherein said face sheets comprise fibers in woven cloth, matt or blanket form and the fibers are glass, aramid, graphite, ceramic or a mixture or combination thereof.

5. The method according to claim 1 wherein said liquid polyimide precursor impregnated foam core is dried after said compression step.

6. The method according to claim 1 wherein said liquid polyimide precursor impregnated face sheet is dried after said impregnation step.

7. The method according to claim 1 wherein said assembly is cured in a mold with at least two mold surfaces in contact with two opposite surfaces of said assembly.

8. The method according to claim 7 wherein the thickness of said assembly between said two opposite surfaces is slightly greater than the spacing between said two mold surfaces, whereby said foam core of said assembly is slightly compressed during molding.

9. The method according to claim 7 wherein said mold surfaces are configured to reshape said assembly.

10. The method according to claim 7 wherein said assembly is assembled and cured by:
   placing a first liquid polyimide precursor impregnated face sheet on a first mold surface which has an other than flat configuration;
   placing a liquid polyimide precursor impregnated foam core over said first face sheet;
   placing a second liquid polyimide precursor impregnated face sheet over said foam core;
   heating the resulting assembly to dry said liquid polyimide precursor;
   placing the second mold surface over said assembly in slight pressure contact therewith; and
   heating said assembly to a temperature sufficient to cure said precursor.

11. The method according to claim 7 wherein said assembly is assembled and cured by:
   (a) placing a first liquid polyimide precursor impregnated face sheet on a first mold surface having an other than flat configuration;
   (b) drying said polyimide precursor to shape retaining, dry, state;
   (c) removing said face sheet from said mold surface;
   (d) repeating steps (a) through (c) with a second face sheet;
   (e) drying said impregnated foam core on a flat surface;
   (f) replacing said first dry face sheet on said other than flat mold surface;
   (g) placing said foam core over said first face sheet and trimming to fit;
   (h) placing said second dry face sheet over said foam core;
   (i) bringing a second mold surface into slight pressure contact with the resulting assembly;
   (j) heating said assembly to a temperature sufficient to cure said precursor.

12. The method according to claim 11 including the further step of reducing the trimmings removed in said trimming step to small pieces and filling any gaps in said fitted foam core with said granules prior to installation of said second face sheet.

13. The method of making structural panels having a polyimide foam core bonded between face sheets which comprises the steps of:
   providing a substantially open-cell polyimide foam core;
   impregnating said foam core with a liquid polyimide precursor;
   compressing said foam core to squeeze out all but the desired quantity of said polyimide precursor;
   drying said foam core at a temperature below the cure temperature of said polyimide precursor;
   impregnating two face sheets with said polyimide precursor;
   drying said two face sheets at a temperature below the cure temperature of said polyimide precursor;
   placing said face sheets on opposite sides of said foam core;
   placing the resulting assembly between mold surfaces adjusted to slightly compress said foam assembly;
   heating said assembly at a temperature below the curing temperature of said polyimide precursor for a period sufficient to allow said assembly to take the shape of the mold surfaces;
   heating said assembly at a temperature sufficient to cure said polyimide precursor for a time period sufficient to produce complete cure; and
   removing the resulting bonded composite structural panel from the mold.

14. The method according to claim 13 wherein said compressing of said foam core is accomplished by passing said foam core between at least one pair of spaced rollers, the space between said rollers being adjusted to squeeze out all but a selected quantity of said polyimide precursor from said foam core.

15. The method according to claim 13 wherein said face sheets comprise fibers in woven cloth, matt or blanket form and the fibers are glass, aramid, graphite, ceramic or a mixture or combination thereof.

16. The method according to claim 13 wherein said mold surfaces are configured to reshape said assembly.

* * * * *